United States Patent [19]

Taylor

[11] Patent Number: 5,706,848

[45] Date of Patent: Jan. 13, 1998

[54] HEAT EXCHANGER PRESSURE SHUTOFF VALVE

[76] Inventor: Julian S. Taylor, 8230 SW. 8th, Oklahoma City, Okla. 73128

[21] Appl. No.: 588,469

[22] Filed: Jan. 18, 1996

[51] Int. Cl.$^6$ .................................................. F16K 17/40
[52] U.S. Cl. ................................. 137/71; 137/505.26
[58] Field of Search ........................... 137/68.11, 71, 137/505.26

[56] References Cited

U.S. PATENT DOCUMENTS

| | | | |
|---|---|---|---|
| 553,851 | 2/1896 | Hardie | 137/505.26 X |
| 1,825,637 | 9/1931 | Ricker | 137/71 X |
| 2,351,047 | 6/1944 | Hughes | 137/71 |
| 4,144,973 | 3/1979 | Green et al. | 137/71 |
| 4,905,723 | 3/1990 | Pritchard et al. | 137/505.26 X |
| 4,907,617 | 3/1990 | Whalen | 137/71 |
| 4,915,127 | 4/1990 | Werley | 137/71 X |
| 5,103,653 | 4/1992 | McGushion et al. | 137/71 |

*Primary Examiner*—John Rivell
*Attorney, Agent, or Firm*—Robert K. Rhea

[57] ABSTRACT

An excessive fluid pressure safety valve for a fluid processing heat exchanger transferring thermal energy to fluids in the heat exchanger by piping extending through the heat exchanger is formed by a valve, normally maintained open by a pressure responsive collapsible pin, interposed in the thermal energy conductor upstream from the heat exchanger. Fluid pressure above a predetermined value in a tube connecting the heat exchanger with the valve axially moves a piston in the valve toward and collapses the pin to close the valve.

7 Claims, 2 Drawing Sheets

HEAT EXCHANGER PRESSURE SHUTOFF VALVE

This invention relates to heat exchangers and more particularly to a pressure shutoff valve monitoring fluid pressure in a fluid process heat exchanger.

BACKGROUND OF THE INVENTION

1. Field of the Invention

Heat necessary for a fluid process in a heat exchanger may be added to the fluid within the heat exchanger by steam flowing through a tortious pipe path within the heat exchanger. In the event a leak develops in the steam piping within the heat exchanger steam escaping into the fluid process generates sufficient pressure to create a personnel, an environmental hazard, or excess pressure on the heat exchanger shell to cause a break.

This invention obviates this dangerous situation by providing a pressure shutoff valve, interposed in a steam line upstream from a heat exchanger, which monitors pressure within the heat exchanger and is biased closed by pressure above a predetermined limit in the heat exchanger. Thus, interrupting steam flow to the heat exchanger.

2. Description of the Prior Art

I do not know of any patents disclosing this feature.

SUMMARY OF THE INVENTION

A fluid pressure monitoring and over pressure shutoff valve is interposed in a steam line upstream from a heat exchanger containing fluids being processed and requiring heat for the process.

A pressure monitoring port on the heat exchanger is connected with the shutoff valve to bias it closed in the event of fluid pressure above a predetermined limit within the heat exchanger.

The principal object of this invention is to provide a normally open shutoff valve interposed in a heat supply to a fluid processing heat exchanger for monitoring pressure in the heat exchanger and closing the valve in the event of fluid pressure above a predetermined limit.

DESCRIPTION OF THE PREFERRED EMBODIMENTS

Figure 1:
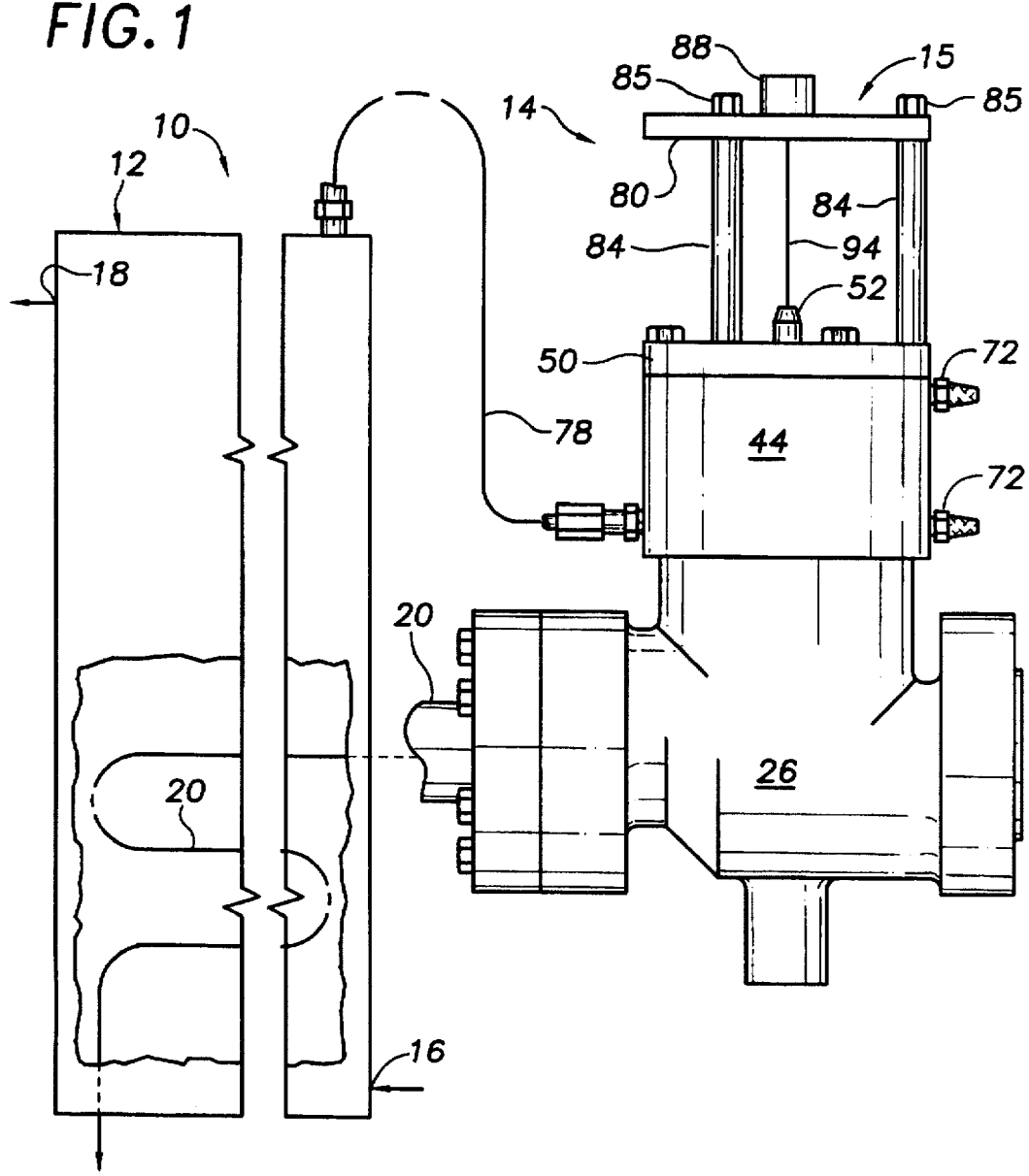
FIG. 1 is a fragmentary side elevational view of a heat exchanger and a fluid pressure monitoring steam shutoff valve.
Figure 2:
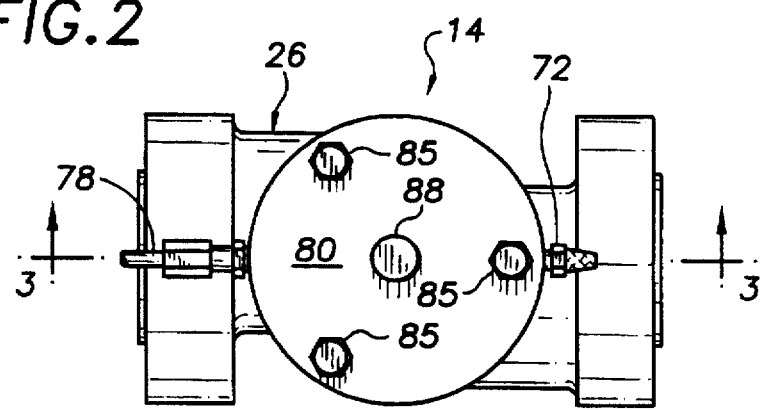
FIG. 2 is a top view, to a larger scale, of FIG. 3.

Like characters of reference designate like parts in those figures of the drawings in which they occur.

In the drawings:

The reference numeral 10 indicates the apparatus comprising a heat exchanger 12 including a steam pressure shutoff valve 14 connected therewith and normally maintained open by a pin cage means 15. The heat exchanger 12 is substantially conventional, and is generally rectangular upright in the example shown, having opposing side, end, top and bottom walls and having inlet and outlet ports 16 and 18 for admitting and exhausting fluid being processed within the heat exchanger.

The heat exchanger further includes a heat conducting line, such as a steam line 20 entering one side wall and following a tortious path within the heat exchanger and exiting an opposite or lower wall.

The shutoff valve 14 comprises a valve body 26 having axially aligned inlet and outlet ports 28 and 30 which are interposed in the steam line or piping 20 and forms a flow passageway 32 through the housing. A web 34 intersects the flow passageway. The valve body is bored through normal to the axis of its inlet and outlet ports, as at 36, and is counterbored, as at 38 and 40.

A sleeve valve seat 42 is axially received threadedly by the counterbore 40 and seals with the web 34 by a crush seal 43. A valve housing bonnet 44 is threadedly connected with the counterbore 38. The bonnet is axially bored, as at 46, and counterbored, as at 48, from its end opposite the housing with a diameter independent of the bore diameter of the valve seat 42. A centrally bored cap 50 overlies the bonnet and seals with its counterbore 48 by an O-ring 49.

A valve stem 52 is slidably received by the housing bores 36, 46, and cap bore 51 with its respective ends exposed to atmosphere through the housing and cap bores.

Figure 3:
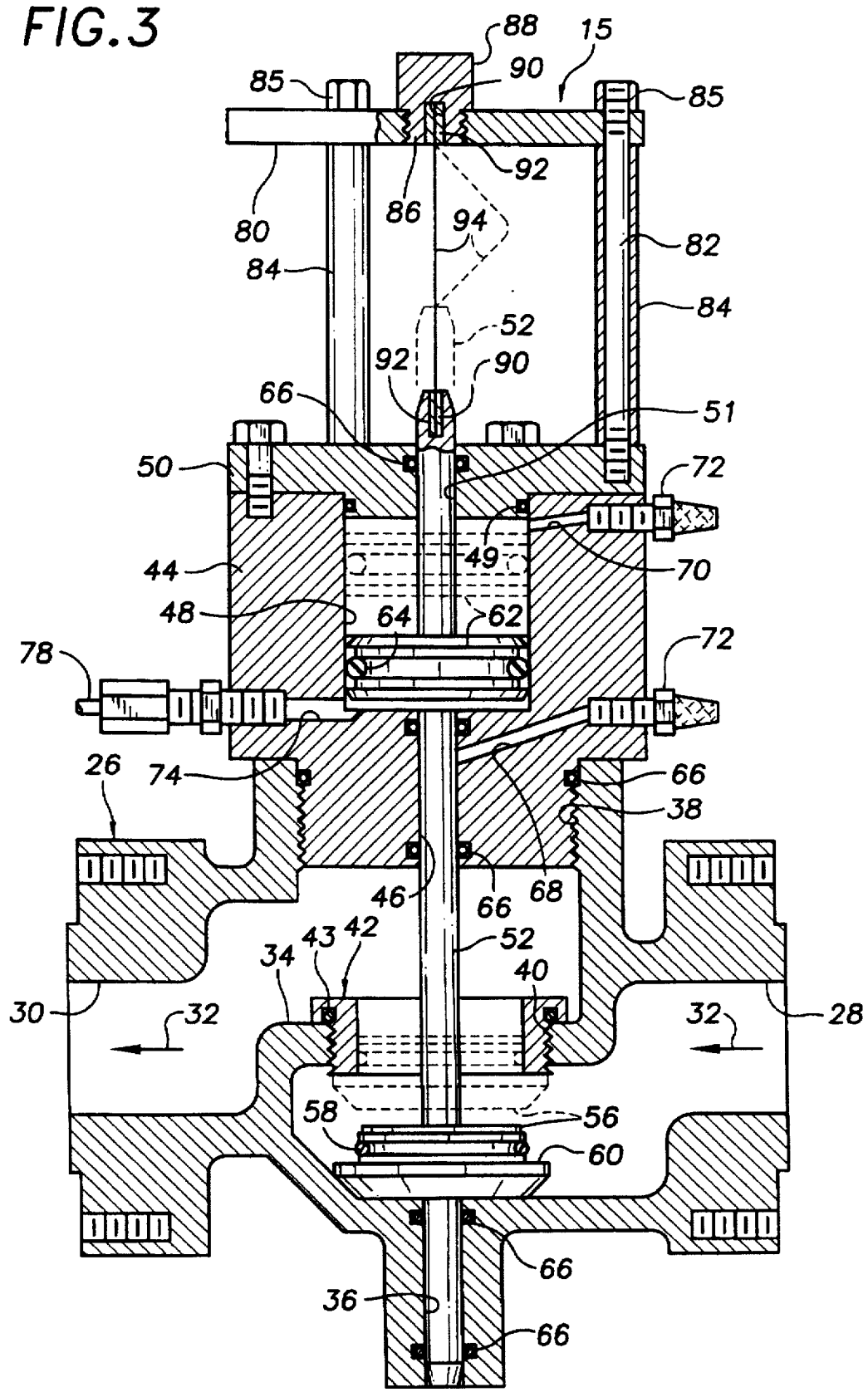
FIG. 3 is a vertical cross sectional view taken substantially along the line 3—3 of FIG. 2 and illustrating the valve in closed position by dotted lines.

A piston-type valve 56 is secured to the depending end portion of the valve stem 52 within the flow passageway 32 and is slidably received by the sleeve valve seat 42 and seals therewith by an annular seal 58. The piston valve further includes an annular upwardly facing shoulder 60 which abuts the depending end surface of the sleeve valve seat 42 when the valve 14 is in closed position (FIG. 3), as presently explained.

Similarly, a piston 62 having a peripheral seal 64 is secured to the valve stem 52 within the bonnet counterbore 48 for the purposes presently explained.

A plurality of O-rings 66 seal the periphery of the valve stem 52 with the valve housing bore 36, bonnet bore 46, and cap bore 51 for reasons presently believed obvious.

Vent holes 68 and 70 through the wall of the bonnet communicate with the bore 46 and counterbore 48, respectively, and have fluid release or vent caps 72 at their outer ends.

A lateral bore in the bore 74 in the bonnet wall communicates with the bonnet counterbore 48 below the piston 62 and is connected with a pressure tap port 76 in the top wall of the heat exchanger 12 by a tube 78 for the purposes presently explained.

The pin cage means 15 comprises a plate 80 maintained in spaced parallel relation with respect to the bonnet cap 50 by a plurality of posts 82 projecting through cooperating bores in the plate 80 and threadedly engaged with the cap 50 in radial and circumferential equally spaced relation. A like plurality of sleeves 84 surround the posts 82 and a post nut 85 is threadedly connected with the end of the respective post opposite the cap 50.

The plate 80 is centrally bored and threaded for receiving the threaded end portion 86 of a step diameter pin supporting nut 88. The confronting ends of the pin holding nut 88 and the valve stem 52 are axially drilled to form sockets 90 respectively receiving inserts 92 for nesting the respective end portions of a collapsible pin 94.

OPERATION

In operation the fluid process within the heat exchanger 12 continues uninterrupted with steam flowing through the valve passageway 32 and piping 20. The valve stem assembly, comprising the valve stem 52, valve 56 and piston 62, remains balanced in the position illustrated by solid lines with both ends of the valve stem exposed to atmosphere. The collapsible pin 94 normally maintains the valve stem assembly in valve open position. The failure or collapsing point of the pin is set to fail or buckle in response to a predetermined pressure within the heat exchanger 12.

In the event of a leak in the tubing 20, within the heat exchanger, fluid pressure generated is applied to the depending surface of the piston 62 through the pressure monitoring tube 78 forcing the piston in an upward direction toward its dotted line position sealing the valve 56 with the cylindrical seat 42 and collapsing the pin 94. Obviously the invention is susceptible to changes or alterations without defeating its practicability. Therefore, I do not wish to be confined to the preferred embodiment shown in the drawings and described herein.

I claim:

1. A normally open pressure responsive valve for interrupting thermal energy transfer to a fluid in a fluid processing heat exchanger having thermal energy piping means extending through the heat exchanger, comprising:

an elongated valve body having a lateral bore and counterbore and having inlet and outlet ports forming a fluid passageway normal to the lateral bore and interposed in said piping;

a valve seat intersecting the fluid passageway;

valve bonnet means including a centrally bored and counterbored bonnet closing the body counterbore;

valve means including a valve stem longitudinally slidable through the body and bonnet means bores for opening and closing the fluid passageway;

a piston on said valve stem in the bonnet means counterbore, said bonnet means having a lateral bore communicating with the bonnet means counterbore between said piston and the inward limit of the counterbore;

a tube connecting the bonnet means lateral bore with the upper limit of the heat exchanger; and, axially collapsible pin means normally maintaining said valve means in fluid passageway open position and closing said passageway in response to fluid pressure in the heat exchanger above a predetermined value moving said piston in a valve closing direction.

2. The shutoff valve according to claim 1 in which said pin means comprises:

pin cage means including a plate secured to said bonnet means in axial outstanding relation; and, an elongated rod-like pin axially extending between said valve stem and said plate.

3. The shutoff valve according to claim 2 in which said pin cage means further includes:

a plurality of post means surrounding said pin in radially spaced relation for connecting said plate with said bonnet means.

4. The shutoff valve according to claim 3 in which said bonnet means further includes:

a centrally bored cap overlying the counterbored end of said bonnet.

5. A normally open pressure responsive valve for interrupting thermal energy transfer to a fluid in a fluid processing heat exchanger having thermal energy piping means extending through the heat exchanger, comprising:

an elongated valve body having inlet and outlet ports forming a fluid passageway interposed in said piping upstream from said heat exchanger, said body having a lateral through bore and a counterbore intersecting the fluid passageway;

a valve seat intersecting the fluid passageway in axial alignment with the through bore;

a centrally bored bonnet closing the body counterbore and having a counterbore opposite the body;

valve means including a valve stem longitudinally slidable in the body and bonnet bores for opening and closing the fluid passageway;

a piston on said valve stem in the bonnet means counterbore, said bonnet having a lateral bore communicating with the bonnet counterbore between said piston and the inward limit of the counterbore;

a tube connecting the bonnet means lateral bore with the upper limit of the heat exchanger;

a centrally bored cap closing the bonnet counterbore; and, axially collapsible pin means normally maintaining said valve means in fluid passageway open position and closing said passageway in response to fluid pressure in the heat exchanger above a predetermined value moving said piston and valve means in a fluid passageway closing direction.

6. The shutoff valve according to claim 5 in which said pin means comprises:

pin cage means including a plate secured to said cap in axial outstanding relation with respect to the adjacent end portion of said valve stem; and, an elongated rod-like pin axially extending between said valve stem and said plate.

7. The shutoff valve according to claim 6 in which said pin cage means further includes:

a plurality of post means surrounding said pin in radially spaced relation for connecting said plate with said cap.

* * * * *